(12) United States Patent
Fröberg Olsson et al.

(10) Patent No.: US 10,917,201 B2
(45) Date of Patent: Feb. 9, 2021

(54) DECODING PARTIAL RADIO TRANSMISSIONS

(71) Applicant: TELEFONAKTIEBOLAGET LM ERICSSON (PUBL), Stockholm (SE)

(72) Inventors: Jonas Fröberg Olsson, Ljungsbro (SE); Erik Eriksson, Linköping (SE); Martin Hessler, Linköping (SE); Simon Sörman, Jönköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/473,692

(22) PCT Filed: Feb. 9, 2017

(86) PCT No.: PCT/IB2017/050723
§ 371 (c)(1),
(2) Date: Jun. 26, 2019

(87) PCT Pub. No.: WO2018/127740
PCT Pub. Date: Jul. 12, 2018

(65) Prior Publication Data
US 2019/0334662 A1    Oct. 31, 2019

Related U.S. Application Data

(60) Provisional application No. 62/444,072, filed on Jan. 9, 2017.

(51) Int. Cl.
*H04L 1/18*    (2006.01)
(52) U.S. Cl.
CPC .......... *H04L 1/1854* (2013.01); *H04L 1/1812* (2013.01)

(58) Field of Classification Search
None
See application file for complete search history.

(56) References Cited

U.S. PATENT DOCUMENTS

2004/0228320 A1* 11/2004 Laroia ................. H04L 1/1671
                                                   370/349
2011/0085511 A1*  4/2011 Fan ...................... H04L 1/1607
                                                   370/329

(Continued)

OTHER PUBLICATIONS

First Examination Report for Indian Patent Application No. 201917022511 dated Sep. 24, 2020, 6 pages.

*Primary Examiner* — Anh Ngoc M Nguyen
(74) *Attorney, Agent, or Firm* — Sage Patent Group

(57) ABSTRACT

According to some embodiments, a method in a radio network element of providing hybrid automatic repeat request (HARQ) feedback comprises receiving, from a wireless transmitter, a first set of coded bits. The first set of coded bits comprises a partial subset of coded bits to be received during a transmission time interval (TTI). The radio network element decodes the first set of coded bits; determines a first decoding indicator based on the success or failure of the decoding of the first set of coded bits; and communicates the first decoding indicator to the wireless transmitter. Particular embodiments communicate the first decoding indicator to the wireless transmitter within four TTI of receiving the first set of coded bits. Particular embodiments estimate a decoding indicator for the entire TTI based on the success or failure of the decoding of the first set of coded bits.

17 Claims, 9 Drawing Sheets

(56) References Cited

U.S. PATENT DOCUMENTS

2012/0121026 A1\* 5/2012 Zhou ................... H04L 1/1819
  375/259
2016/0269150 A1 9/2016 Jiang et al.

\* cited by examiner

US 10,917,201 B2

DECODING PARTIAL RADIO TRANSMISSIONS

This application is a 371 of International Application No. PCT/162017/050723, filed Feb. 9, 2017, which claims the benefit of U.S. Provisional Application No. 62/444,072, filed Jan. 9, 2017, the disclosures of which are fully incorporated herein by reference.

TECHNICAL FIELD

Particular embodiments are directed to wireless communications and, more particularly, to decoding partially received radio transmissions.

BACKGROUND

A Third Generation Partnership Project (3GPP) wireless network may use hybrid automatic repeat request (HARQ) to detect and correct errors. If the receiver detects an error in the received data, then the receiver buffers the data and requests a re-transmission from the sender. The receiver combines the re-transmitted data with the buffered data prior to channel decoding and error detection. A HARQ example is illustrated in FIG. 1.

FIG. 1 is a block diagram illustrating an example of HARQ operation in a long term evolution (LTE) system. The illustrated example depicts HARQ operation for downlink, but the procedure is not limited to downlink. The downlink (DL) comprises a sequence of transmission time intervals (TTI) 10 (also referred to as transmission unit 10) and the uplink (UL) comprises a sequence of TTI 15 (also referred to as transmission unit 15). In LTE the TTI comprises a 1 ms subframe.

A radio transmitter, such as an evolved NodeB (eNB), transmits data on a physical downlink shared channel (PDSCH) during one transmission unit 10 (e.g., transmission unit 10a). After the transmission, a radio receiver, such as a user equipment (UE), attempts to decode the transmission. For frequency division duplex (FDD), the radio receiver transmits a HARQ ACK/NAK (depending on the results of the decoding) four subframes after the initial transmission (e.g., transmission unit 15e). If the radio transmitter receives a HARQ NAK, the radio transmitter will re-transmit four subframes after receiving the feedback transmission (e.g., transmission unit 10i). For time division duplex (TDD), the time differences between transmission, feedback, and retransmission are at least four subframes.

The transmission (and possible subsequent re-transmissions) do not consist solely of data bits. The scheduler protects the data (or information) bits that it has determined to transmit with an error detecting code, a cyclic-redundancy check (CRC), and then codes the bits with forward error correction (FEC). An example is illustrated in FIG. 2.

FIG. 2 is a block diagram illustrating example HARQ redundancy using a ¼ rate code. The coded bits are punctured into different redundancy versions, each containing a different set of the coded bits. In each transmission and following retransmissions, a different redundancy version is (typically) transmitted. The receiver stores all received transmissions, and can thus combine several transmissions when attempting decoding. This is referred to as soft combining. The result is that the received total code rate is lowered if needed. If more transmissions are required than available redundancy versions, they will be repeated.

HARQ with soft combining leads to an implicit reduction of the data rate by means of retransmissions and can thus be referred to as implicit link adaptation. However, in contrast to link adaptation based on explicit estimates of the instantaneous channel conditions, HARQ with soft combining implicitly adjusts the coding rate based on the result of the decoding. In terms of overall throughput, this kind of implicit link adaptation can be superior to explicit link adaptation because additional redundancy is only added when needed (e.g., when the receiver cannot correctly decode previous higher-rate transmissions).

A problem with LTE HARQ is the latency incurred when transmitting small packets of data. A packet that fits into a single subframe will experience almost ten times more latency if a retransmission is needed, as compared to a successful initial transmission.

Another problem is that HARQ feedback is used in link adaptation, which relies on both frequent ACK and NAK events. For efficient channel usage, there must be a relatively large number of retransmissions.

Another problem with LTE HARQ occurs for critical machine type communication (C-MTC) traffic with extreme latency and reliability requirements. Some C-MTC traffic requires the block error ratio (BLER) to be as low as $10^{-6}$. At these low error rates, link adaptation becomes problematic. Essentially every link adaptation solution relies on an outer-loop component, which adjusts link adaptation based on the ACK/NAK feedback, to reach a target BLER. With a target BLER at $10^{-6}$, the error events are rare which means that the outer-loop will be slow to adjust to the true radio conditions.

SUMMARY

The embodiments described herein include facilitating a radio receiver decoding a radio transmission before the end of the transmission unit, at one or more time instances. In some embodiments, multiple decoding attempts all create HARQ feedback, which may be an indication of success/failure or may be a likelihood value. In some embodiments, the radio receiver sends HARQ feedback almost immediately after the received transmission has ended based on the reception and decoding of a first portion of the transmission being a proper subset of the transmission. This provides better HARQ feedback information, and facilitates earlier decoding and feedback creation.

In some embodiments, the decoding interval is network configured to achieve a first BLER value higher than a desired BLER value when decoding at the end of the transmission interval. In some embodiments, HARQ feedback is sent before the transmission has ended, which facilitates instantaneous retransmission.

According to some embodiments, a method in a radio network element of providing hybrid automatic repeat request (HARQ) feedback comprises receiving, from a wireless transmitter, a first set of coded bits. The first set of coded bits comprises a partial subset of coded bits to be received during a transmission time interval (TTI). The radio network element decodes the first set of coded bits; determines a first decoding indicator based on the success or failure of the decoding of the first set of coded bits; and communicates the first decoding indicator to the wireless transmitter.

In particular embodiments, the radio network element communicates the first decoding indicator to the wireless transmitter within four TTI of receiving the first set of coded bits. The radio network element may estimate a decoding indicator for the entire TTI based on the success or failure of the decoding of the first set of coded bits.

In particular embodiments, the method further comprises receiving, from the wireless transmitter, a second set of coded bits different from the first set of coded bits. The second set of coded bits is a partial subset of coded bits to be received during the TTI. The method further comprises decoding the second set of coded bits, and determining a second decoding indicator based on the success or failure of the decoding of the second set of coded bits. Some embodiments may communicate the second decoding indicator to the wireless transmitter. Some embodiments may combine the first decoding indicator and the second decoding indicator to form a combined decoding indicator, and communicate the combined decoding indicator to the wireless transmitter.

In particular embodiments, the method further comprises receiving, from the wireless transmitter, an indication of one or more intervals during the TTI at which to decode the set of coded bits. The radio network element may comprise a wireless device or a network node.

According to some embodiments, a method in a radio network element of receiving HARQ feedback comprises: transmitting a set of coded bits during a first TTI to a wireless receiver; and receiving, from the wireless receiver, a first decoding indicator representing a success or failure of the wireless receiver in decoding the set of coded bits. The first decoding indicator is received within four TTI of the first TTI.

In particular embodiments, the first decoding indicator indicates a failure of the wireless receiver in decoding the set of coded bits and the method further comprises scheduling a retransmission of the set of coded bits during a second TTI. The second TTI may be two TTI after the first TTI.

In particular embodiments, the method further comprises: receiving, from the wireless receiver, a second decoding indicator representing a success of the wireless receiver in decoding the set of coded bits; and rescheduling the second TTI to transmit a new set of coded bits.

In particular embodiments, the first decoding indicator comprises an estimate of a decoding indicator for the set of coded bits based on a decoding of a partial subset of the set of coded bits.

In particular embodiments, the method further comprising transmitting, to the wireless receiver, an indication of one or more intervals during the TTI at which to decode the set of coded bits. The radio network element may comprise a wireless device or a network node.

According to some embodiments, a radio network element operable to provide HARQ feedback comprises processing circuitry operable to receive, from a wireless transmitter, a first set of coded bits. The first set of coded bits comprises a partial subset of coded bits to be received during a TTI. The processing circuitry is further operable to decode the first set of coded bits; determine a first decoding indicator based on the success or failure of the decoding of the first set of coded bits; and communicate the first decoding indicator to the wireless transmitter.

According to some embodiments, a radio network element capable of receiving HARQ feedback comprises processing circuitry operable to: transmit a set of coded bits during a first TTI to a wireless receiver; and receive, from the wireless receiver, a first decoding indicator representing a success or failure of the wireless receiver in decoding the set of coded bits. The first decoding indicator is received within four TTI of the first TTI.

According to some embodiments, a radio network element operable to provide HARQ feedback comprises a receiving module, a decoding module, and a transmitting module. The receiving module is operable to receive, from a wireless transmitter, a first set of coded bits. The first set of coded bits comprises a partial subset of coded bits to be received during a TTI. The decoding module is operable to: decode the first set of coded bits; and determine a first decoding indicator based on the success or failure of the decoding of the first set of coded bits. The transmitting module is operable to communicate the first decoding indicator to the wireless transmitter.

According to some embodiments, a radio network element operable to receive HARQ feedback comprises a receiving module and a transmitting module. The transmitting module is operable to transmit a set of coded bits during a first TTI to a wireless receiver. The receiving module is operable to receive, from the wireless receiver, a first decoding indicator representing a success or failure of the wireless receiver in decoding the set of coded bits. The first decoding indicator is received within four TTI of the first TTI.

Also disclosed is a computer program product. The computer program product comprises instructions stored on non-transient computer-readable media which, when executed by a processor, perform the act of receiving, from a wireless transmitter, a first set of coded bits. The first set of coded bits comprises a partial subset of coded bits to be received during a transmission time interval (TTI). The instructions further performs the acts of decoding the first set of coded bits; determining a first decoding indicator based on the success or failure of the decoding of the first set of coded bits; and communicating the first decoding indicator to the wireless transmitter.

Another computer program product comprises instructions stored on non-transient computer-readable media which, when executed by a processor, perform the acts of transmitting a set of coded bits during a first TTI to a wireless receiver; and receiving, from the wireless receiver, a first decoding indicator representing a success or failure of the wireless receiver in decoding the set of coded bits. The first decoding indicator is received within four TTI of the first TTI.

Particular embodiments may exhibit some of the following technical advantages. For example, particular embodiments may receive HARQ information usable in scenarios when normal HARQ feedback is useless. One example scenario is when the BLER requirement is so low (e.g., $10^{-6}$) that basically no NAK feedback bits are sent.

Another advantage is that in case of extreme latency requirements particular embodiments facilitate HARQ feedback on a first portion of a transmission, which enables the HARQ to be sent earlier than possible in conventional systems. For example, in a FDD system the HARQ feedback can be sent prior to the end of the original transmission, enabling zero delay retransmission. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
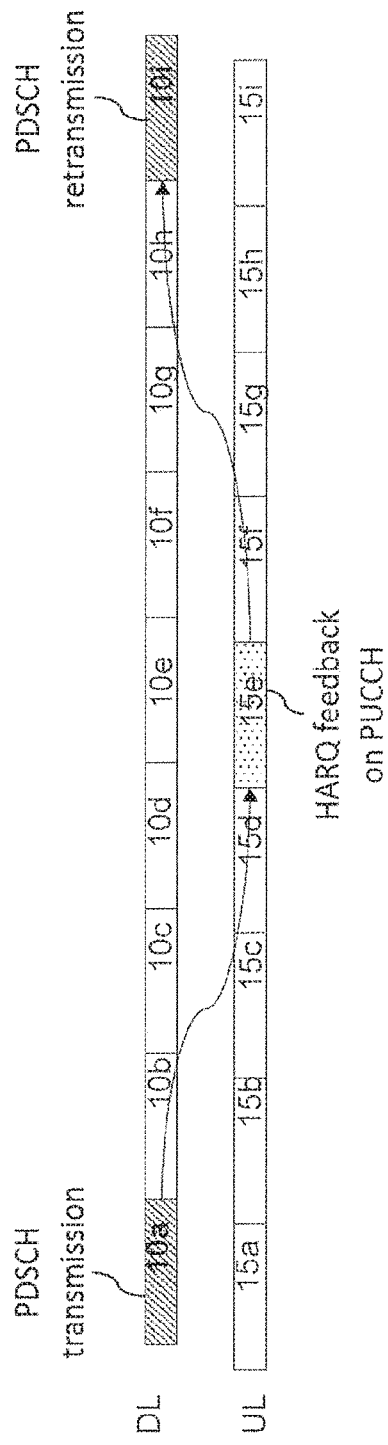
FIG. 1 is a block diagram illustrating an example of hybrid automatic repeat request (HARQ) operation in a long term evolution (LTE) system.
Figure 2:
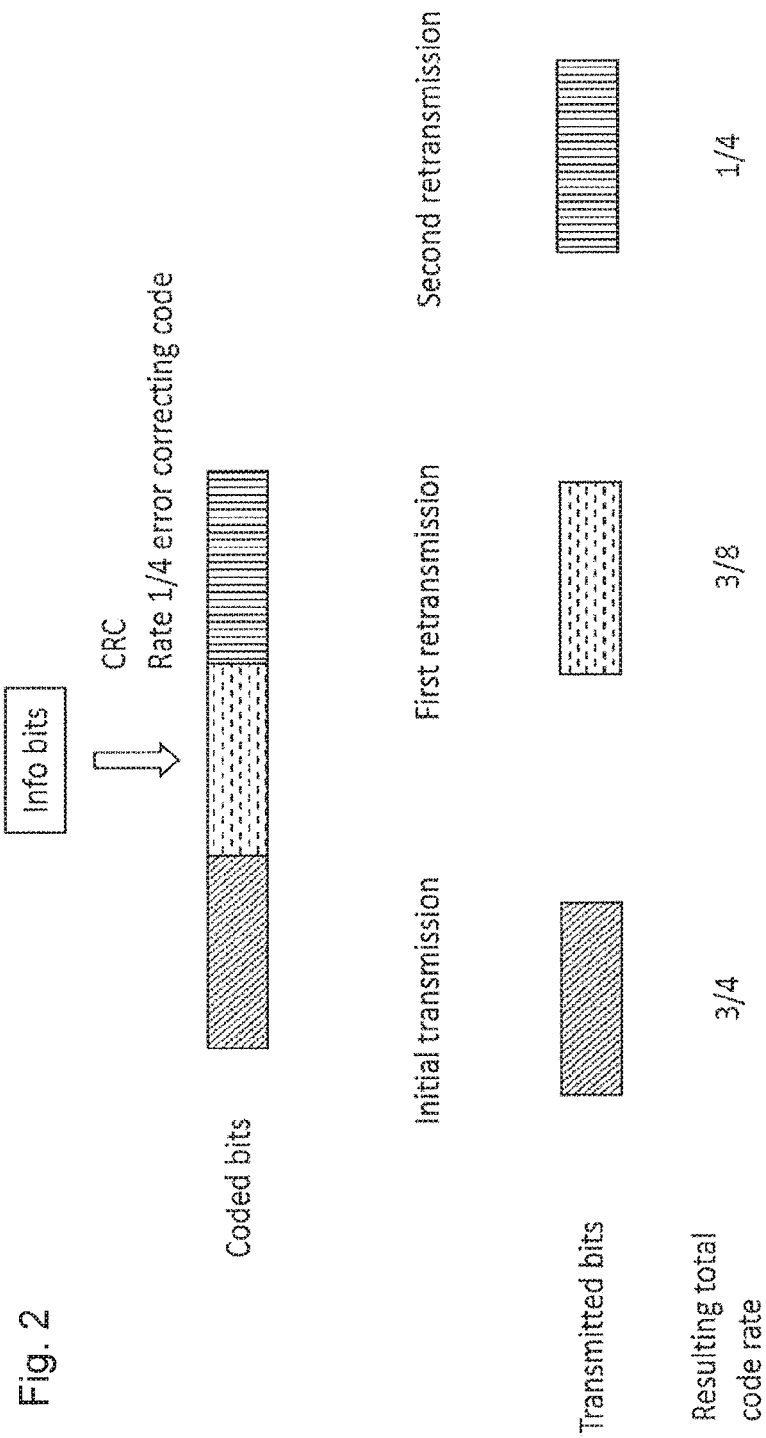
FIG. 2 is a block diagram illustrating example HARQ redundancy using a ¼ rate code.

A Third Generation Partnership Project (3GPP) wireless network may use hybrid automatic repeat request (HARQ) to detect and correct errors. A particular problem with LTE HARQ is the latency incurred when transmitting small packets of data. A packet that fits into a single subframe will experience almost ten times more latency than a successful initial transmission if a re-transmission is needed.

Another problem is with link adaptation. HARQ feedback is used in link adaptation, which relies on both frequent ACK and NAK events. For efficient channel usage, a relatively large number of retransmissions must be present. For example, critical machine type communication (C-MTC) traffic may include extreme latency and reliability requirements, such as a block error ratio (BLER) as low as $10^{-6}$. At this low error rate, link adaptation becomes problematic. A link adaptation solution that relies on an outer-loop component adjusts link adaptation based on the ACK/NAK feedback to reach a target BLER. With a target BLER at $10^{-6}$, the error events are rare which means that the outer-loop will be slow to adjust to the true radio conditions.

For 5G, 3GPP may require a HARQ process to send the ACK/NAK feedback earlier than in LTE. A New Radio (NR) design may facilitate corresponding acknowledgement reporting shortly (on the order of X µs) after the end of a downlink data transmission, where X is in the order of a few tens or hundreds µs.

Particular embodiments obviate the problems described above and include facilitating a radio receiver decoding a radio transmission at one or more time instances before the end of the transmission unit. In some embodiments, multiple decoding attempts all create HARQ feedback, which could be an indication of success/failure or it could be a likelihood value. In some embodiments, the radio receiver sends HARQ feedback almost immediately after the received transmission has ended based on the reception and decoding of a first portion of the transmission being a proper subset of the transmission. This provides better HARQ feedback information, and facilitates earlier decoding and feedback creation.

In some embodiments, the decoding interval is network configured to achieve a first BLER value higher than a desired BLER value when decoding at the end of the transmission interval. In some embodiments, HARQ feedback is sent before the transmission has ended, which facilitates instantaneous retransmission.

Particular embodiments may receive HARQ information usable in scenarios when normal HARQ feedback is useless. One example scenario is when the BLER requirement is so low (e.g., $10^{-6}$) that almost no NAK feedback bits are sent.

Under extreme latency requirements, particular embodiments facilitate HARQ feedback on a first portion of a transmission, which enables the HARQ to be sent earlier than possible in conventional systems. For example, in a FDD system the HARQ feedback can be sent prior to the end of the original transmission, enabling zero delay retransmission.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 3-9B of the drawings, like numerals being used for like and corresponding parts of the various drawings. LTE is used throughout this disclosure as an example cellular system, but the ideas presented herein may apply to other wireless communication systems as well.

Figure 3:
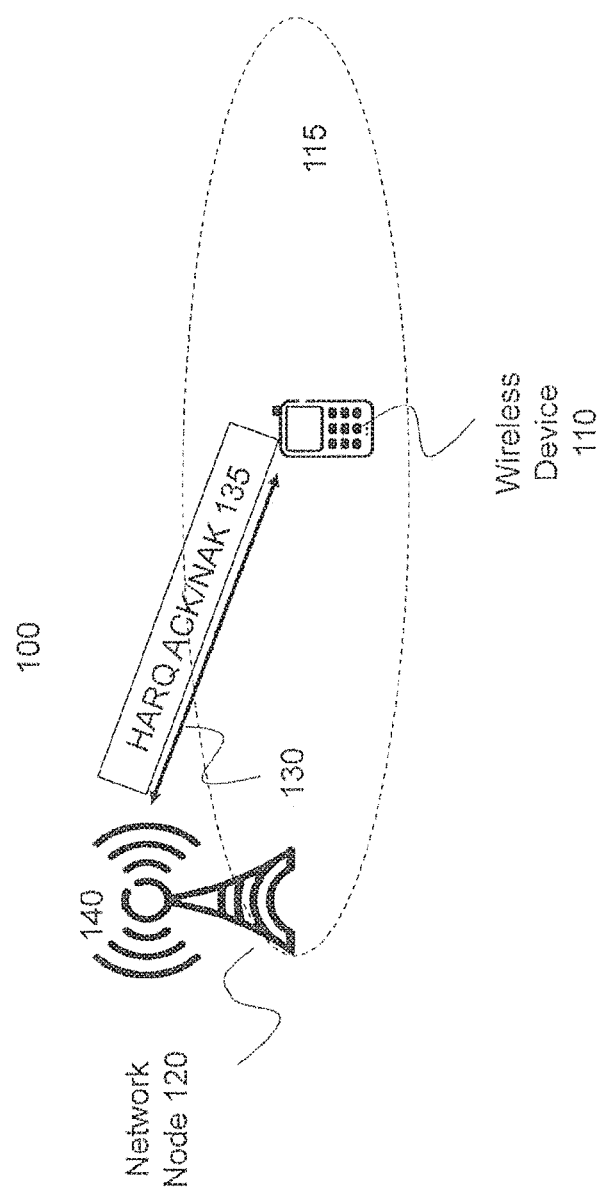
FIG. 3 is a block diagram illustrating an example wireless network, according to some embodiments.

FIG. 3 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter 140 or multiple transmitters 140 for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless signals 130 may include transmission units or transmission time intervals (TTI) (e.g., subframes) such as those described with respect to FIG. 1. Wireless device 110 and network node 120 may perform hybrid automatic repeat request (HARQ) error correction. Wireless device 110 and/or network node 120 may transmit HARQ ACK/NAK feedback 135 indicating whether a subframe was decoded successfully.

In particular embodiments, a radio network element such as wireless device 110 or network node 120 receives a first set of coded bits. The radio network element may be referred to as a wireless receiver. The first set of coded bits comprises a partial subset of coded bits to be received during the TTI (e.g., ¼, ½, ¾, etc. of the total set of coded bits to be received during the TTI). The radio network element decodes the first set of coded bits; determines a first decoding indicator based on the success or failure of the decoding of the first set of coded bits; and communicates the first decoding indicator back to the radio network element transmitting the coded bits, such as wireless device 110 or network node 120 (i.e., the wireless transmitter).

In particular embodiments, the wireless transmitter may configure the wireless receiver to decode a set of coded bits at one or more intervals during the TTI. For example, network node 230 may send an indication to wireless device 110 that wireless device 110 should perform four partial decodings at equally spaced intervals during the TTI (other embodiments may include any suitable number of decodings at any suitable time during the TTI). Particular algorithms for sending HARQ ACK/NAK feedback are described in more detail with respect to FIGS. 4-7.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 8A below. Similarly, a network node may include any suitable combination of hardware and/or software. For example, in particular embodiments, a network node, such as network node 120, may include the components described with respect to FIG. 9A below.

In general, a radio network element (e.g., wireless device 110, network node 120, etc.) determines a first set of received coded bits, wherein said first set is a true subset of coded bits assigned to the wireless device. For example, the first set of received coded bits may be a partial reception of a TTI or subframe. The radio network element performs a decoding attempt of the determined first set of received coded bits and determines an indicator (e.g., a HARQ ACK/NAK) based on the performed decoding attempt. The radio network element transmits the determined indicator back to the sender of the coded bits. In some embodiments, the procedure may be referred to as fast HARQ or fast asynchronous HARQ. An example is illustrated in FIG. 4.

Figure 4:
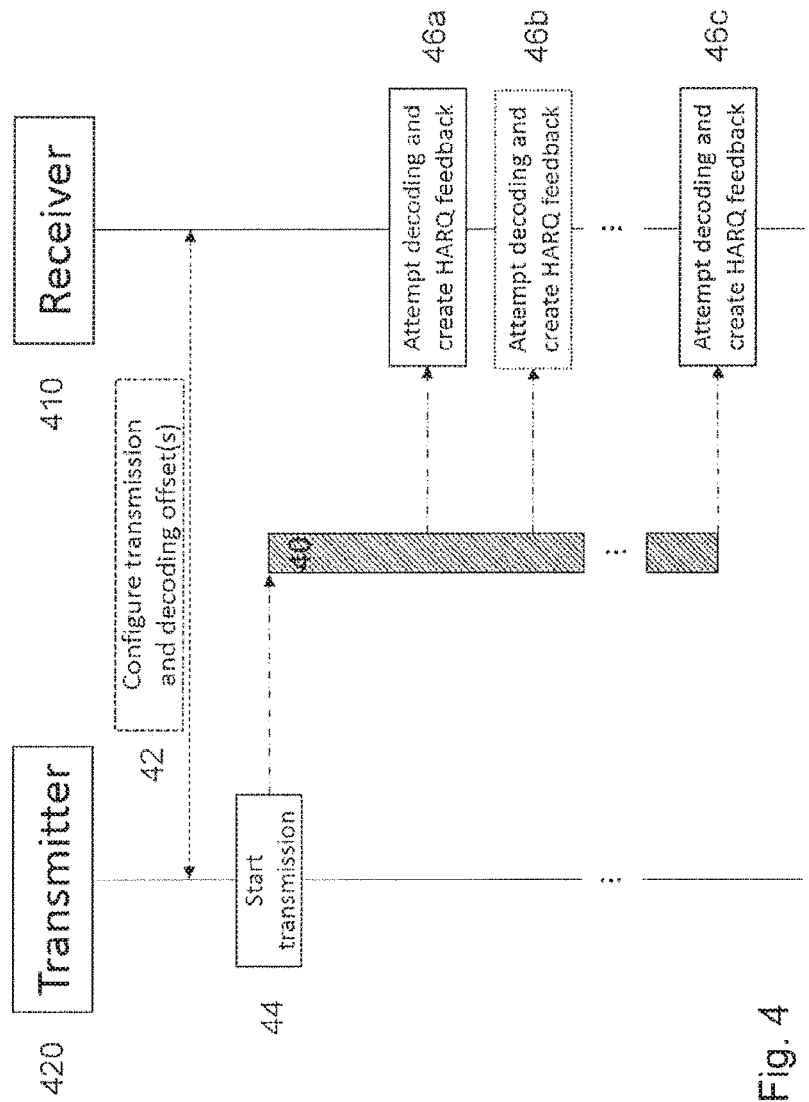
FIG. 4 is a flow diagram illustrating an example decoding of a partial transmission unit, according to particular embodiments.

FIG. 4 is a flow diagram illustrating an example decoding of a partial transmission unit, according to particular embodiments. In general, transmitter 420 transmits transmission unit 40 to receiver 410.

Transmitter 420 and receiver 410 may include any radio network element, such as wireless device 110 or network node 120. For example, in some embodiments network node 120 may transmit a transmission unit to wireless device 110. In some embodiments, wireless device 110 may transmit a transmission unit to network node 120. Although particular embodiments may be described with respect to an eNB and a UE, the procedure is not restricted to communication between an eNB and a UE, but is applicable to communication between any type of radio network elements. Transmission unit 40 may refer to an LTE subframe or to any suitable TTI. In general, the steps illustrated in FIG. 4 may be performed by any of the components of network 100 described with respect to FIG. 3.

At step 42, transmitter 420 and receiver 410 may configure transmission and decoding offsets. For example, transmitter 420 may configure receiver 410 to attempt decoding at one or more intervals during reception of transmission unit 40.

Particular embodiments may take into account capabilities of particular radio network elements. For example, a particular wireless device, such as a UE, may or may not support the fast HARQ procedure, or a particular network node, such as an eNB, may not be able to benefit from the fast HARQ procedure.

In some embodiments, transmitter 420 and receiver 410 may exchange capability information. For example, a wireless device may signal to network node 120 whether the wireless device supports fast HARQ. The network node can consider the capabilities of the wireless device when determining how to configure HARQ functionality of the wireless device.

For example, if the wireless device does not support fast HARQ, then the network node may configure the wireless device to perform a single decoding attempt after receiving the entire transmission unit. If the wireless device supports fast HARQ, then the network node may configure the wireless device to perform one or more decoding attempts while receiving the transmission unit. Depending on a particular link adaptation algorithm, a network node may configure more or less decoding attempts (e.g., more decoding attempts where the link adaptation algorithm benefits from more feedback).

At step 44 the transmitter begins transmitting transmission unit 40 to receiver 410. For example, network node 120 may begin transmitting a subframe to wireless device 110.

At step 46, receiver 410 attempts to decode the partially received transmission unit 40 and generate HARQ feedback based on the partial decoding. For example, wireless device 110 may begin decoding a partial subframe received from network node 120.

To perform decoding on the partially received subframe, receiver 410 may perform erasures for data bits not yet received. The not yet received data bits may be marked as undecided when performing some error correction algorithms. The decoding procedure may take into account the unknown bits during the decoding process.

In some embodiments, receiver 410 may perform more than one decoding attempt (e.g., steps 46a, 46b, 46c, etc.) at various intervals during reception of transmission unit 40. The feedback from the decoding attempts can be used in several ways. As one example, receiver 410 may send individual ACK/NAKs for each decoding attempt. As another example, receiver 410 may aggregate or combine the results of each decoding attempt together to form a joint feedback value that is sent to transmitter 420.

Particular embodiments may schedule retransmission with fast asynchronous HARQ in various ways. In some embodiments fast HARQ is configured such that a wireless device sends HARQ feedback at the end of the same subframe that the corresponding transmission took place in. The wireless device may be configured to make one partial decoding attempt. The feedback created from the partial attempt may be transmitted at the end of the subframe, while the feedback from the decoding attempt of the complete transmission unit may be transmitted in the next subframe. This could be achieved for example with bundling of HARQ feedback (i.e., the feedback from the end decoding in subframe n is bundled together with the partial attempt feedback from subframe n+1). It could also be achieved by multiplexing the feedback together with an uplink transmission. The latter example is illustrated in FIG. 5.

Figure 5:
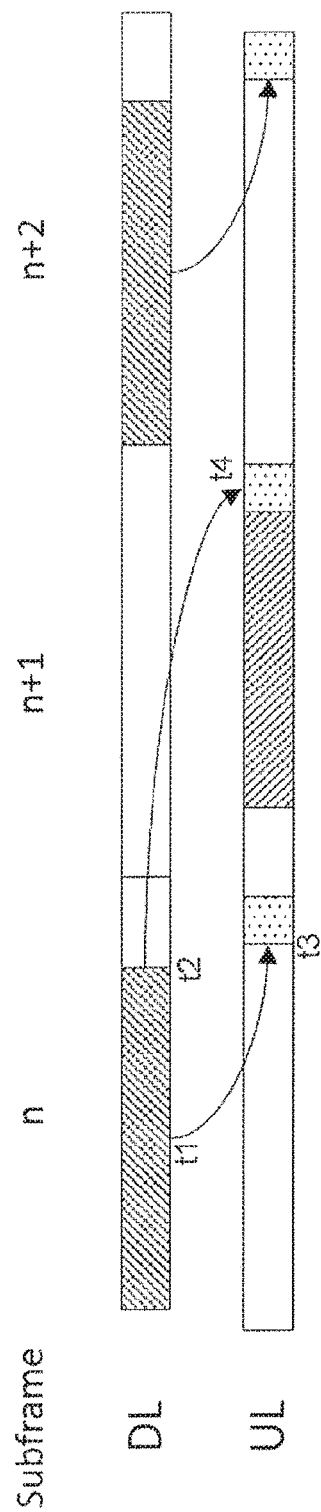
FIG. 5 is a block diagram illustrating an example of scheduling with partial decoding, according to some embodiments.

FIG. 5 is a block diagram illustrating an example of scheduling with partial decoding, according to some embodiments. FIG. 5 illustrates successive downlink transmission units (e.g., TTI) n, n+1, and n+2, and corresponding uplink transmission units. The horizontal axis represents time. Although in the illustrated example embodiment the downlink transmission may be described as being transmitted from a network node and received by a wireless device, in other embodiments the transmission may be between any two radio network elements.

The network node transmits data during transmission unit n. The wireless device decodes the received transmission unit up to the portion transmitted at time t1. At time t3 the wireless device transmits HARQ feedback to the network node based on the partial decoding up to time t1. In the illustrated example, time t3 when the wireless device is ready to transmit feedback is before the end of transmission unit n. In other embodiments, t3 may occur after n (e.g., during n+1).

At time t2 the network node completes transmitting the data for transmission unit n. In the illustrated embodiment, the network node completes transmitting data before the end of transmission unit n. In other embodiments, the network node may use the entire transmission unit n to transmit the data. At time t4, the wireless device has decoded the entire transmission unit n and is able to transmit HARQ feedback to the network node. In the illustrated embodiment, the HARQ feedback at time t4 is piggybacked with an uplink transmission.

In asynchronous HARQ, the network node (e.g., network node 120) is responsible for scheduling retransmission, if needed, in any subsequent subframe. Early partial decoding feedback gives the network node an indication if it should schedule a retransmission opportunity or not, enabling the possibility to schedule it as early as in subframe n+2. At the same time, the processing requirements for the wireless device (e.g., wireless device 110) are lower than if the final decoding feedback would be required in the same subframe. The partial decoding feedback may thus be treated in some embodiments as a likelihood of success at the end of the transmission unit.

In particular embodiments, feedback from the end decoding can be used to determine if an actual retransmission in the already scheduled subframe is needed. If not, the scheduled resource could be used for new data that is available in the transmitting buffer. A cost associated with this embodiment is that if no additional data is available, the allocated transmission is wasted overhead.

In some embodiments, partial decoding attempts may be combined to form soft feedback. For example, the HARQ feedback from all decoding attempts may be used together to form better feedback information than the conventional ACK/NAK response. In one example, the link adaptation may be partially based on the received feedback from HARQ processes, which can then be more efficient because the link adaptation algorithm receives more information.

In some embodiments, a simple outer loop link adaptation maintains an offset s, which is updated upon HARQ feedback reception according to $s=s+\Delta_{ACK}$ if the feedback was ACK, and $s=s-\Delta_{NAK}$ if NAK. The block error rate of this scheme is:

$$BLER = \frac{1}{1+\frac{\Delta_{NAK}}{\Delta_{ACK}}}$$

Furthermore, the magnitude of the steps controls both how accurate the outer loop is on average and how fast it converges/adapts to changes. Large steps make the outer loop adapt to changes quickly, but it also lowers the average accuracy of the outer loop as it backs off more. A normal target BLER is 10%, which enables the link adaptation to follow the changes in channel quality quite well.

The outer loop relies on both receiving ACK and NAK relatively often to be able to tune in. If a very low target error rate is desired, using C-MTC for example, NAKs will be very rare, making the tuning in procedure less effective. With extra levels of feedback provided by the partial decoding attempts, the link adaptation gets more control points to tune to, which will occur more frequently than NAK of the full transmission, increasing the accuracy of the outer loop. This observation holds independently of the applied outer loop link adaptation scheme.

For example, with one decoding offset and feedback comprising only success/failure of the attempts, there are three possible feedback situations: partial decoding succeeded, partial decoding failed but final succeeded, and final decoding failed. In this way, there are two levels of feedback where the final decoding succeeds, which makes it possible to tune the link adaptation without relying on receiving NAK feedback.

Particular embodiments include improved link adaptation for C-MTC with a block error probability below $10^{-6}$. As described above, outer-loop link adaption is problematic due to the rare error events. Particular embodiments solve this problem.

Based on the BLER versus SINR curve for the FEC code, a required SINR (i.e., $SINR_T$) to achieve $10^{-6}$ may be obtained. The BLER versus SINR curve also provides a required SINR (i.e., $SINR_O$) to reach $10^{-3}$ BLER for example, where $SINR_T > SINR_O$.

In a particular example embodiment, a network node configures a wireless device to perform a partial decoding of a data transmission and to transmit an indicator of the decoding result. The wireless device may also transmit an indicator of the decoding result of the complete transmission. In embodiments with extreme latency requirements, no re-transmissions of the data may be performed wherein the link adaptation needs to adapt the single data transmission to reach $10^{-6}$. In such embodiments, the indicator may be used to adjust the outer-loop, and not as an indicator of whether the data was correctly received (data will be correctly received except in some extremely rare cases).

The partial-decoding configuration of the wireless device may be an instruction that a certain fraction of the coded bits shall be partially decoded. The fraction may be selected such that the wireless device will fail with a rate of $10^{-3}$. The indicator of the partial decoding result transmitted by the wireless device may then be used to trigger an outer-loop component. When performing a new link adaptation decision, the link adaption may use an SINR offset equal to $SINR_{outer\text{-}loop}+(SINR_T-SINR_O)$ (i.e., the link adaptation adds the SINR difference to achieve $10^{-6}$ from the $10^{-3}$ that the outer-loop component operate with).

In some embodiments, the LTE framework for HARQ-ACK may be extended to support the fast HARQ. For example, the LTE framework may be extended with configuration support to instruct the wireless device to transmit the HARQ-ACK based on the decoding result of a subset of the coded bits.

The indicator may be transmitted using various methods. As a first example, the indicator may be transmitted on the physical uplink control channel (PUCCH) as HARQ-ACK (extending the interpretation) or as an additional indication beside the legacy HARQ-ACK. As another example, the indication may be transmitted as a media access control (MAC) control element. The indicator may be an indicator indicating the results of one or more partial decoding attempts.

In some embodiments, the partial decoding feedback may be treated as a likelihood of success at the end of the transmission unit. For example, based on the partial decoding, a wireless receiver may estimate a success or failure for the entire TTI based on the partial decoding. The wireless transmitter may receive a single HARQ ACK/NAK response after transmitting the TTI, similar to conventional HARQ except that the wireless transmitter may receive the HARQ ACK/NAK sooner than with conventional HARQ because the wireless receiver is able to perform the partial decoding early and then estimate a response for the entire TTI based on the partial decoding.

Figure 6:
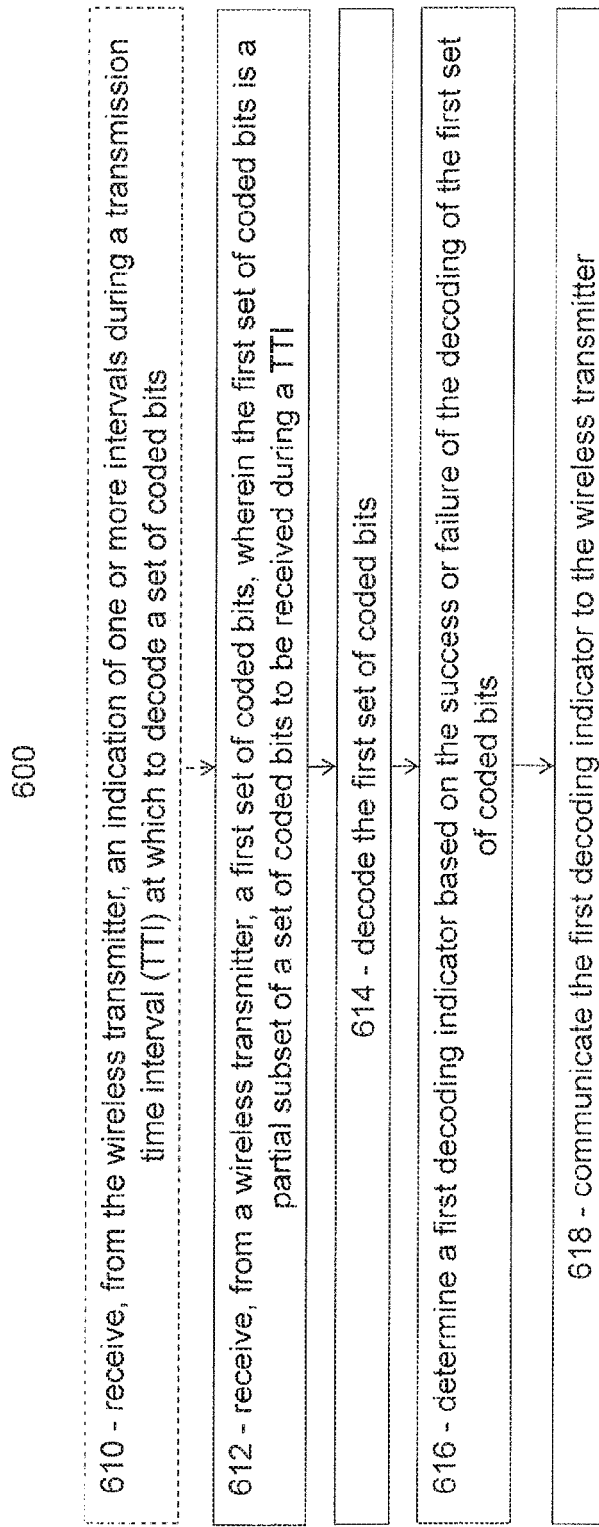
FIG. 6 is a flow diagram illustrating an example method in a wireless receiver of providing hybrid automatic repeat request (HARQ) feedback, according to some embodiments.
Figure 7:
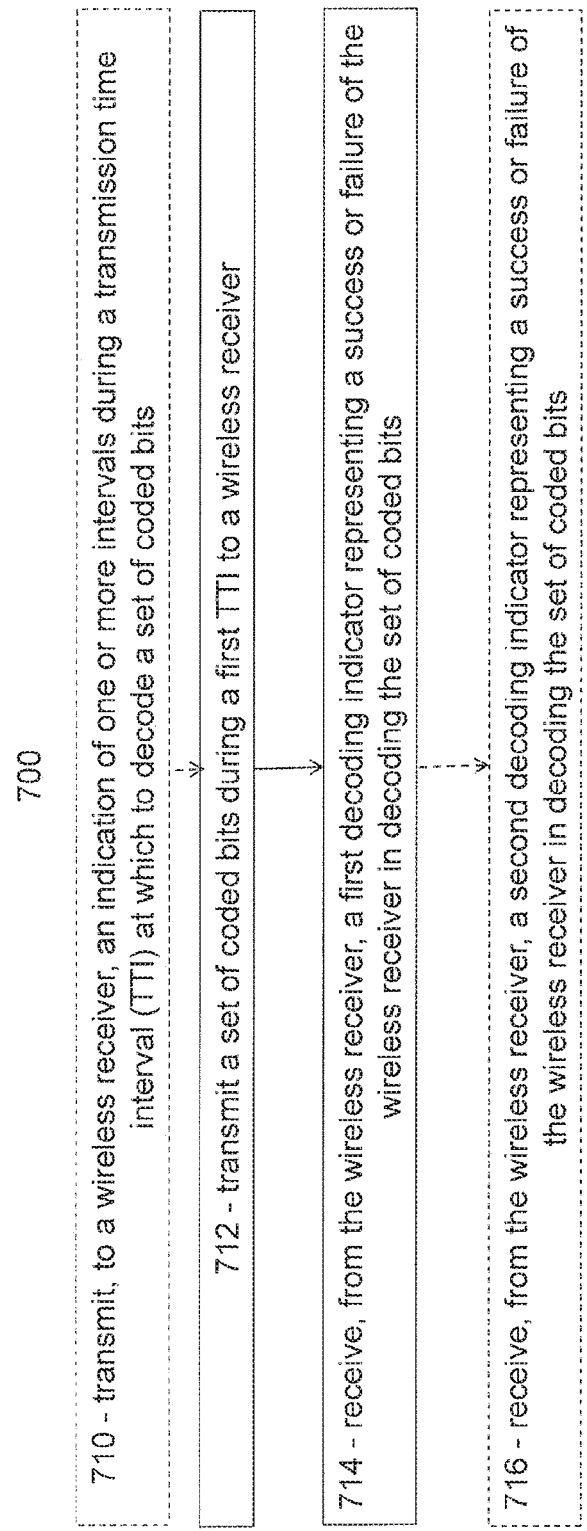
FIG. 7 is a flow diagram illustrating an example method in a wireless transmitter of receiving hybrid automatic repeat request (HARQ) feedback, according to some embodiments.

The examples described with respect to FIGS. 4 and 5 may be generally represented by the flowcharts in FIG. 6 (with respect to a wireless receiver) and FIG. 7 (with respect to a wireless transmitter).

FIG. 6 is a flow diagram illustrating an example method in a wireless receiver of providing hybrid automatic repeat request (HARQ) feedback, according to some embodiments. In particular embodiments, one or more steps of FIG. 6 may be performed by radio network elements of wireless network 100 described with respect to FIG. 3. Although particular examples may be described with respect to a network node or a wireless device, the embodiments described herein may be performed by a network node, a wireless device, or any other suitable radio network element.

The method begins at step 610, where a radio network element may receive, from a wireless transmitter, an indication of one or more intervals during a TTI at which to decode a set of coded bits. For example, network node 120 may send an indication to wireless device 110 that wireless device 110 should perform a partial decoding after receiving ¼ of the transmission unit. As another example, network node 120 may send an indication to wireless device 110 that wireless device 110 should perform four partial decodings at equally spaced intervals during the TTI. An interval may refer to a time interval or to a particular number of coded bits. Additional examples are described with respect to FIG. 4.

Other embodiments may include any suitable number of decodings at any suitable intervals. In some embodiments, the radio network element may perform partial decodings at preconfigured intervals (e.g., predetermined based on a standard specification, based on network operator configuration, etc.).

At step 612, the radio network element receives, from a wireless transmitter, a first set of coded bits, wherein the first set of coded bits is a partial subset of coded bits to be received during a TTI. For example, wireless device 110 may receive a partial subset of coded bits from network node 120 in TTI n, such as TTI n described with respect to FIG. 5 or transmission unit 40 described with respect to FIG. 4. If TTI n includes X coded bits, then wireless device 110 may receive Y coded bits, where Y is less than X.

At step 614, the radio network element decodes the first set of coded bits. For example, wireless device 110 may decode a subset of coded bits, such as the subsets described with respect to any of steps 46a-c of FIG. 4, or time t3 or t4 of FIG. 5.

To perform decoding on the first set of coded bits, the radio network element may perform erasures for data bits not yet received. The not yet received data bits may be marked as undecided when performing some error correction algorithms. The decoding procedure may take into account the unknown bits during the decoding process.

At step 616, the radio network element determines a first decoding indicator based on the success or failure of the decoding of the first set of coded bits. For example, wireless device 110 may determine the success or failure of decoding any of the partial resources of the TTI, such as described with respect to any of steps 46a-c of FIG. 4, or time t3 or t4 of FIG. 5.

In particular embodiments, the decoding indicator may comprise an estimate of success or failure for the entire TTI. For example, if the radio network element fails to decode the first set of coded bits according to a first threshold error rate, the radio network element may estimate that decoding of the entire TTI may fail by a second threshold error rate, and thus send a failure decoding indicator (e.g., HARQ NAK) to the wireless transmitter.

At step 618, the radio network element communicates the first decoding indicator to the wireless transmitter. For example, wireless device 110 may transmit a HARQ ACK or NAK to network node 120. In particular embodiments, the radio network element communicates the first decoding indicator to the wireless transmitter within four TTI of receiving the first set of coded bits.

In particular embodiments, the indicator may be transmitted on the physical uplink control channel (PUCCH) as HARQ-ACK (extending the interpretation) or as an additional indication beside the legacy HARQ-ACK. As another example, the indication may be transmitted as a media access control (MAC) control element. The indicator may be an indicator indicating the results of one or more partial decoding attempts. Other embodiments may include any suitable signaling mechanism between the two radio network elements.

Modifications, additions, or omissions may be made to method 600. For example, particular embodiments may repeat steps 612 to 618 multiple times for a single TTI (e.g., steps 46*a-c* of FIG. 4). For example, the radio network element may receive a second set of coded bits different from the first set of coded bits. The second set of coded bits is a partial subset of coded bits to be received during the TTI. The radio network element decodes the second set of coded bits, and determines a second decoding indicator based on the success or failure of the decoding of the second set of coded bits. Some embodiments may communicate the second decoding indicator to the wireless transmitter. Some embodiments may combine the first decoding indicator and the second decoding indicator to form a combined decoding indicator, and communicate the combined decoding indicator to the wireless transmitter. Particular embodiments may combine success or failure determinations from multiple partial decodings.

Additionally, one or more steps in method 600 of FIG. 6 may be performed in parallel or in any suitable order. The steps of method 600 may be repeated over time as necessary.

FIG. 7 is a flow diagram illustrating an example method in a wireless transmitter of receiving hybrid automatic repeat request (HARQ) feedback, according to some embodiments. In particular embodiments, one or more steps of FIG. 7 may be performed by radio network elements of wireless network 100 described with respect to FIG. 3. Although particular examples may be described with respect to a network node or a wireless device, the embodiments described herein may be performed by a network node, a wireless device, or any other suitable radio network element.

The method begins at step 710, where a radio network element transmits an indication of one or more intervals during a TTI at which to decode a set of coded bits. For example, network node 120 may send an indication to wireless device 110 that wireless device 110 should perform a partial decoding after receiving ¼ of the transmission unit. As another example, network node 120 may send an indication to wireless device 110 that wireless device 110 should perform four partial decodings at equally spaced intervals during the TTI. An interval may refer to a time interval or to a particular number of coded bits. Additional examples are described with respect to FIG. 4.

Other embodiments may include any suitable number of decodings at any suitable intervals. In some embodiments, the radio network element may perform partial decodings at preconfigured intervals (e.g., predetermined based on a standard specification, based on network operator configuration, etc.).

At step 712, the radio network element transmits a set of coded bits during a first transmission time interval (TTI) to a wireless receiver. For example, network node 120 may transmit a set of coded bits from network node 120 in TTI n, such as TTI n described with respect to FIG. 5 or transmission unit 40 described with respect to FIG. 4.

At step 714, the radio network element receives, from the wireless receiver, a first decoding indicator representing a success or failure of the wireless receiver in decoding the set of coded bits. The decoding indicator is received within four TTI of the first TTI. For example, wireless device 110 may decode a subset of coded bits, such as the subsets described with respect to any of steps 46*a-c* of FIG. 4, or time t3 or t4 of FIG. 5 and send. Because wireless device 110 performed the decoding on a subset of the TTI, wireless device 110 is able to send a first decoding indicator to network node 120 earlier than with conventional HARQ (i.e., less than 4 TTI from receiving the first TTI).

At step 716, the radio network element may receive, from the wireless receiver, a second decoding indicator representing a success or failure of the wireless receiver in decoding the set of coded bits. For example, wireless device 110 may perform partial decoding during multiple intervals of the first TTI, such as described with respect to FIGS. 4 and 5. Wireless device 110 may send one or more decoding indicators based on the partial decodings.

In particular embodiments, if the radio network element receives the decoding indicator indicating a failure of the wireless receiver in decoding the set of coded bits of TTI n, then the radio network element may schedule a retransmission for a second TTI, such as TTI n+2 (which is sooner than a conventional retransmission scheduled for TTI n+4). If the radio network element subsequently receives a second decoding indicator representing a success of the wireless receiver in decoding the set of coded bits, then the radio network element may reschedule the second TTI to transmit a new set of coded bits.

Modifications, additions, or omissions may be made to method 700. For example, particular embodiments may repeat steps 714 to 716 multiple times for a single TTI (e.g., steps 46*a-c* of FIG. 4). Particular embodiments may combine success or failure determinations from multiple partial decodings. Additionally, one or more steps in method 700 of FIG. 7 may be performed in parallel or in any suitable order. The steps of method 700 may be repeated over time as necessary.

Figure 8B:
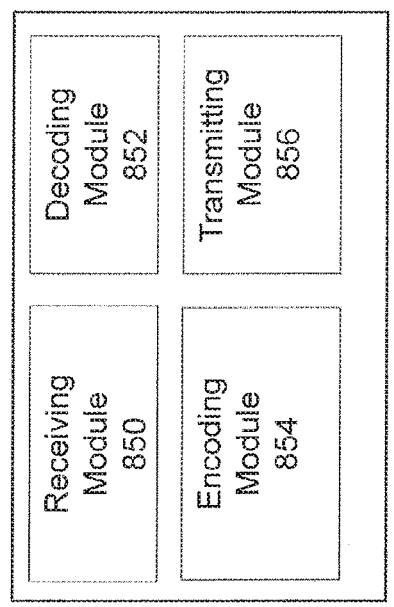
FIG. 8B is a block diagram illustrating example components of a wireless device.
Figure 8A:
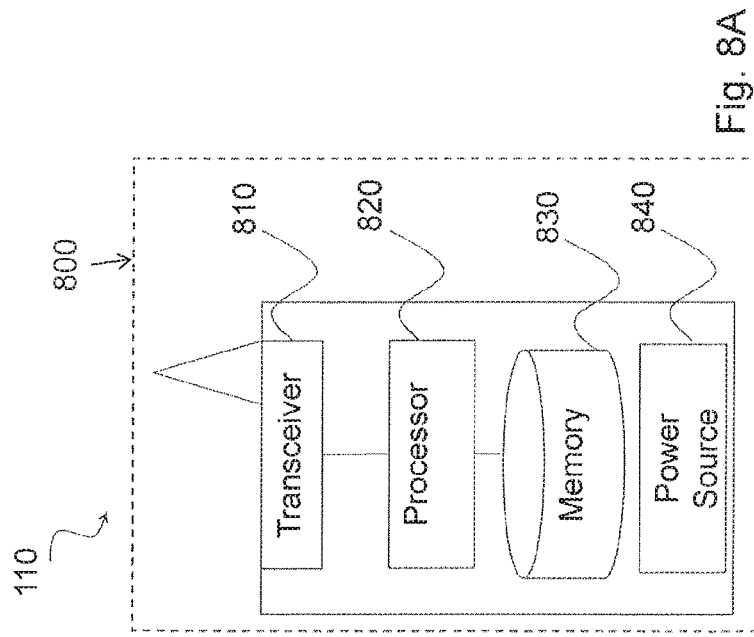
FIG. 8A is a block diagram illustrating an example embodiment of a wireless device.

FIG. 8A is a block diagram illustrating an example embodiment of a wireless device. The wireless device is an example of the wireless devices 110 illustrated in FIG. 3. In particular embodiments, the wireless device is capable of encoding a transmission unit (e.g., TTI, subframe, etc.), and performing decoding on a partial transmission unit.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes processing circuitry 800. Processing circuitry 800 includes transceiver 810, processor 820, memory 830, and power source 840. In some embodiments, transceiver 810 facilitates transmitting wireless signals to and receiving wireless signals from wireless network node 120 (e.g., via an antenna), processor 820 executes instructions to provide some or all of the functionality described herein as provided by the wireless device, and memory 830 stores the instructions executed by processor 820. Power source 840 supplies electrical power to one or more of the components of wireless device 110, such as transceiver 810, processor 820, and/or memory 830.

Processor 820 includes any suitable combination of hardware and software implemented in one or more integrated circuits or modules to execute instructions and manipulate data to perform some or all of the described functions of the wireless device. In some embodiments, processor 820 may include, for example, one or more computers, one more programmable logic devices, one or more central processing units (CPUs), one or more microprocessors, one or more applications, and/or other logic, and/or any suitable combination of the preceding. Processor 820 may include analog and/or digital circuitry configured to perform some or all of the described functions of wireless device 110. For example, processor 820 may include resistors, capacitors, inductors, transistors, diodes, and/or any other suitable circuit components.

Memory 830 is generally operable to store computer executable code and data. Examples of memory 830 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 840 is generally operable to supply electrical power to the components of wireless device 110. Power source 840 may include any suitable type of battery, such as lithium-ion, lithium-air, lithium polymer, nickel cadmium, nickel metal hydride, or any other suitable type of battery for supplying power to a wireless device. In particular embodiments, processor 820 in communication with transceiver 810 encodes a transmission unit (e.g., TTI, subframe, etc.), and performs decoding on a partial transmission unit.

Other embodiments of the wireless device may include additional components (beyond those shown in FIG. 8A) responsible for providing certain aspects of the wireless device's functionality, including any of the functionality described above and/or any additional functionality (including any functionality necessary to support the solution described above).

FIG. 8B is a block diagram illustrating example components of a wireless device 110. The components may include receiving module 850, decoding module 852, encoding module 854, and transmitting module 856.

Receiving module 850 may perform the receiving functions of wireless device 110. For example, receiving module 850 may receive a transmission unit from a network node. The transmission unit comprises a set of coded bits. In some embodiments, receiving module 850 may receive configuration information, such as an indication of one or more intervals during a TTI at which to decode a set of coded bits. In certain embodiments, receiving module 850 may include or be included in processor 820. In particular embodiments, receiving module 850 may communicate with decoding module 854.

Decoding module 852 may perform the decoding functions of wireless device 110. For example, decoding module 852 may perform partial decoding of a transmission unit. In certain embodiments, decoding module 852 may include or be included in processor 820. In particular embodiments, decoding module 852 may communicate with receiving module 850.

Encoding module 854 may perform the encoding functions of wireless device 110. For example, encoding module 854 may encode a transmission unit. In certain embodiments, encoding module 854 may include or be included in processor 820. In particular embodiments, encoding module 854 may communicate with transmitting module 856.

Transmitting module 856 may perform the transmitting functions of wireless device 110. For example, transmitting module 856 may communicate a transmission unit to network node 120. In some embodiments, transmitting module 856 may transmit configuration information, such as an indication of one or more intervals during a TTI at which to decode a set of coded bits. In certain embodiments, transmitting module 856 may include or be included in processor 820. In particular embodiments, transmitting module 856 may communicate with encoding module 854.

Figure 9B:
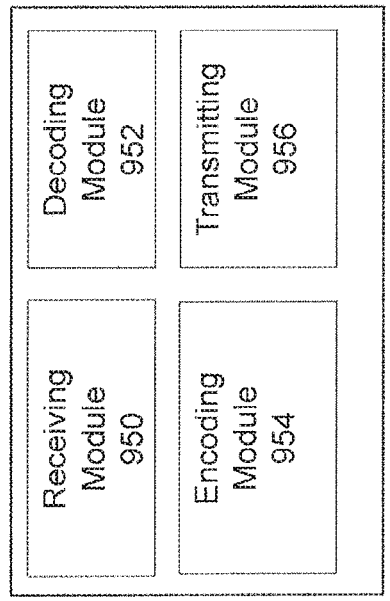
FIG. 9B is a block diagram illustrating example components of a network node.
Figure 9A:
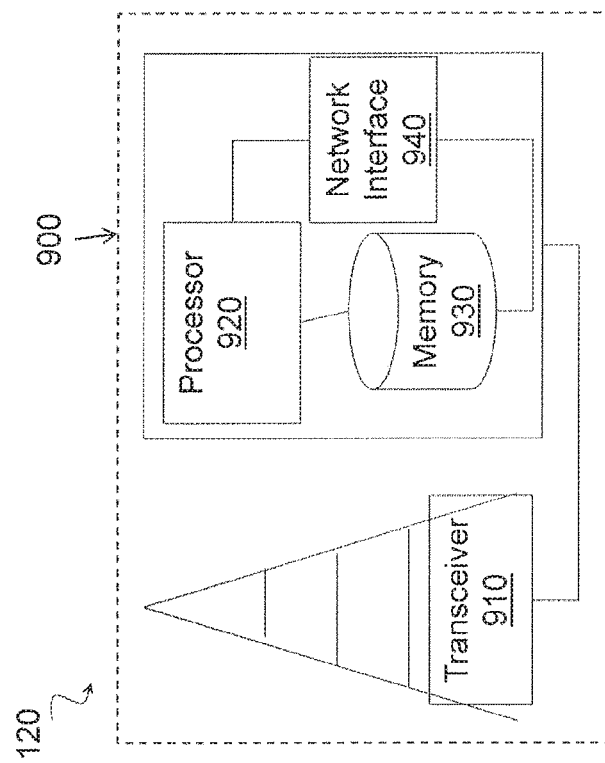
FIG. 9A is a block diagram illustrating an example embodiment of a network node.

FIG. 9A is a block diagram illustrating an example embodiment of a network node. The network node is an example of the network node 120 illustrated in FIG. 3. In particular embodiments, the network node is capable of encoding a transmission unit (e.g., TTI, subframe, etc.), and performing decoding on a partial transmission unit.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes processing circuitry 900. Processing circuitry 900 includes at least one transceiver 910, at least one processor 920, at least one memory 930, and at least one network interface 940. Transceiver 910 facilitates transmitting wireless signals to and receiving wireless signals from a wireless device, such as wireless devices 110 (e.g., via an antenna); processor 920 executes instructions to provide some or all of the functionality described above as being provided by a network node 120; memory 930 stores the instructions executed by processor 920; and network interface 940 communicates signals to backend network components, such as a gateway, switch, router, Internet, Public Switched Telephone Network (PSTN), controller, and/or other network nodes 120. Processor 920 and memory 930 can be of the same types as described with respect to processor 820 and memory 830 of FIG. 8A above.

In some embodiments, network interface 940 is communicatively coupled to processor 920 and refers to any suitable device operable to receive input for network node 120, send output from network node 120, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network. In particular embodiments, processor 920 in communication with transceiver 910 encodes a transmission unit (e.g., TTI, subframe, etc.), and performs decoding on a partial transmission unit.

Other embodiments of network node 120 include additional components (beyond those shown in FIG. 9A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 9B is a block diagram illustrating example components of a network node 120. The components may include receiving module 950, decoding module 952, encoding module 954, and transmitting module 956.

Receiving module 950 may perform the receiving functions of network node 120. For example, receiving module 950 may receive a transmission unit from a wireless device. The transmission unit comprises a set of coded bits. In some embodiments, receiving module 950 may receive configuration information, such as an indication of one or more intervals during a TTI at which to decode a set of coded bits. In certain embodiments, receiving module 950 may include or be included in processor 920. In particular embodiments, receiving module 950 may communicate with decoding module 954.

Decoding module 952 may perform the decoding functions of network node 120. For example, decoding module 952 may perform partial decoding of a transmission unit. In certain embodiments, decoding module 952 may include or be included in processor 920. In particular embodiments, decoding module 952 may communicate with receiving module 950.

Encoding module 954 may perform the encoding functions of network node 120. For example, encoding module 954 may encode a transmission unit. In certain embodiments, encoding module 954 may include or be included in processor 920. In particular embodiments, encoding module 954 may communicate with transmitting module 956.

Transmitting module 956 may perform the transmitting functions of network node 120. For example, transmitting module 956 may communicate a transmission unit to wireless device 110. In some embodiments, transmitting module 956 may transmit configuration information, such as an indication of one or more intervals during a TTI at which to decode a set of coded bits. In certain embodiments, transmitting module 956 may include or be included in processor 920. In particular embodiments, transmitting module 956 may communicate with encoding module 954.

The embodiments described herein differ from other solutions referred to as "back-to-back retransmission" or "pro-active retransmission." In those solutions the network node performs one or more re-transmissions without waiting for HARQ feedback. For example, network node performs a first transmission in TTI=n (i.e., subframe n) and in the next TTI=n+1 performs a re-transmission without getting a HARQ feedback for the transmission in TTI=n. The wireless device first decodes TTI=n and if it fails it may continue with TTI=n+1 (combining TTI n and n+1). In the embodiments described herein, the wireless device provides HARQ feedback to the network node. The feedback is provided faster than conventional HARQ feedback.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
ACK Acknowledgement
BLER Block Error Rate
BTS Base Transceiver Station
C-MTC Critical Machine Type Communication
CRC Cyclic Redundancy Check
D2D Device to Device
DL Downlink
eNB eNodeB
FDD Frequency Division Duplex
FEC Forward Error-correction Code
HARQ Hybrid Automatic Repeat Request
LTE Long Term Evolution
MAC Medium Access Control
M2M Machine to Machine
MIMO Multi-Input Multi-Output
MTC Machine Type Communication
NAK Negative Acknowledgement
NR New Radio
PDSCH Physical Downlink Shared Channel
PUCCH Physical Uplink Control Channel
RAN Radio Access Network
RAT Radio Access Technology
RB Radio Bearer
RBS Radio Base Station
RNC Radio Network Controller
RRC Radio Resource Control
RRH Remote Radio Head
RRU Remote Radio Unit
SINR Signal-to-Interference-plus-Noise Ratio
TDD Time Division Duplex
UE User Equipment
UL Uplink
UTRAN Universal Terrestrial Radio Access Network
WAN Wireless Access Network

The invention claimed is:

1. A method in a radio network element of providing hybrid automatic repeat request (HARQ) feedback, the method comprising:
   receiving, from a wireless transmitter, an indication of one or more intervals during a transmission time interval (TTI) at which to decode one or more partial subsets of the set of coded bits;
   receiving, from the wireless transmitter, a first set of coded bits, wherein the first set of coded bits is a partial subset of the set of coded bits to be received during the TTI;
   decoding the first set of coded bits at the one or more intervals during the TTI;
   determining a first decoding indicator based on the success or failure of the decoding of the first set of coded bits; and
   communicating the first decoding indicator to the wireless transmitter.

2. The method of claim 1, wherein communicating the first decoding indicator to the wireless transmitter occurs within four TTI of receiving the first set of coded bits.

3. The method of claim 1, wherein determining the first decoding indicator comprises estimating a decoding indicator for the set of coded bits to be received during the TTI based on the success or failure of the decoding of the first set of coded bits.

4. The method of claim 1, further comprising:
   receiving, from the wireless transmitter, a second set of coded bits different from the first set of coded bits, wherein the second set of coded bits is a partial subset of the set of coded bits to be received during the TTI;
   decoding the second set of coded bits; and
   determining a second decoding indicator based on the success or failure of the decoding of the second set of coded bits.

5. The method of claim 4, further comprising communicating the second decoding indicator to the wireless transmitter.

6. The method of claim 4, wherein communicating the first decoding indicator to the wireless transmitter comprises:
  combining the first decoding indicator and the second decoding indicator to form a combined decoding indicator; and
  communicating the combined decoding indicator to the wireless transmitter.

7. The method of claim 1, wherein the radio network element comprises a wireless device.

8. The method of claim 1, wherein the radio network element comprises a network node.

9. A method in a radio network element of receiving hybrid automatic repeat request (HARQ) feedback, the method comprising:
  transmitting, to a wireless receiver, an indication of one or more intervals during a transmission time interval (TTI) at which to decode one or more partial subsets of a set of coded bits;
  transmitting the set of coded bits during a first TTI to the wireless receiver;
  receiving, from the wireless receiver, a first decoding indicator representing a success or failure of the wireless receiver in decoding the set of coded bits; and
  wherein the first decoding indicator is based on a decoding of a partial subset of the set of coded bits at the one or more intervals during the first TTI.

10. The method of claim 9, wherein the first decoding indicator is received within four TTI of the first TTI.

11. The method of claim 9, wherein the first decoding indicator indicates a failure of the wireless receiver in decoding the set of coded bits and the method further comprises scheduling a retransmission of the set of coded bits during a second TTI.

12. The method of claim 11, wherein the second TTI is two TTI after the first TTI.

13. The method of claim 10, further comprising:
  receiving, from the wireless receiver, a second decoding indicator representing a success of the wireless receiver in decoding the set of coded bits; and
  rescheduling the second TTI to transmit a new set of coded bits.

14. The method of claim 1, wherein the first decoding indicator comprises an estimate of a decoding indicator for the set of coded bits based on a decoding of a partial subset of the set of coded bits.

15. The method of claim 1, wherein the radio network element comprises a wireless device.

16. The method of claim 1, wherein the radio network element comprises a network node.

17. A radio network system for communicating hybrid automatic repeat request (HARQ) feedback, the radio network system comprising:
  a first radio network element operable to provide HARQ feedback, the first radio network element comprising processing circuitry operable to:
    receive, from a wireless transmitter, an indication of one or more intervals during a transmission time interval (TTI) at which to decode one or more partial subsets of the set of coded bits;
    receive, from the wireless transmitter, a first set of coded bits, wherein the first set of coded bits is a partial subset of the set of coded bits to be received during the TTI;
    decode the first set of coded bits at the one or more intervals during the TTI;
    determine a first decoding indicator based on the success or failure of the decoding of the first set of coded bits; and
    communicate the first decoding indicator to the wireless transmitter; and
  a second radio network element capable of receiving HARQ feedback, the second radio network element comprising processing circuitry operable to:
    transmit, to a wireless receiver, the indication of one or more intervals during the transmission time interval (TTI) at which to decode the one or more partial subsets of a set of coded bits;
    transmit the set of coded bits during a first TTI to the wireless receiver;
    receive, from the wireless receiver, the first decoding indicator, wherein the first decoding indicator is based on a decoding of a partial subset of the set of coded bits at the one or more intervals during the first TTI.

* * * * *